(12) United States Patent
Oh et al.

(10) Patent No.: US 10,089,976 B2
(45) Date of Patent: Oct. 2, 2018

(54) BUILDING AUTOMATION SYSTEMS WITH VOICE CONTROL

(71) Applicant: Honeywell International Inc., Morristown, NJ (US)

(72) Inventors: Eric Oh, Syosset, NY (US); Kenneth L. Addy, Massapequa, NY (US); David S. Zakrewski, Babylon, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 220 days.

(21) Appl. No.: 14/053,073

(22) Filed: Oct. 14, 2013

(65) Prior Publication Data

US 2015/0106086 A1   Apr. 16, 2015

(51) Int. Cl.
*G10L 15/22* (2006.01)
*H04L 12/28* (2006.01)
*G10L 15/00* (2013.01)

(52) U.S. Cl.
CPC ............ *G10L 15/00* (2013.01); *H04L 12/282* (2013.01); *H04L 12/283* (2013.01); *G10L 2015/223* (2013.01); *H04L 2012/285* (2013.01)

(58) Field of Classification Search
CPC .. G10L 17/22; G10L 15/265; G10L 2015/223
USPC ........................................................ 704/275
See application file for complete search history.

(56) References Cited

U.S. PATENT DOCUMENTS

| | | | |
|---|---|---|---|
| 5,086,385 A * | 2/1992 | Launey et al. ................... 700/83 |
| 5,109,222 A * | 4/1992 | Welty ........................... 340/12.28 |
| 6,513,006 B2 * | 1/2003 | Howard ............... G10L 15/1822 |
| | | | 348/E5.105 |
| 6,535,854 B2 * | 3/2003 | Buchner et al. ............... 704/275 |
| 6,735,619 B1 * | 5/2004 | Sawada .......................... 709/212 |
| 6,813,221 B1 * | 11/2004 | Barr ............................... 367/198 |
| 6,988,070 B2 * | 1/2006 | Kawasaki ............... G10L 15/26 |
| | | | 704/270 |
| 7,031,920 B2 * | 4/2006 | Dowling et al. ............... 704/270 |
| 8,340,975 B1 * | 12/2012 | Rosenberger .................. 704/275 |
| 8,966,561 B2 * | 2/2015 | Van Doorn ..................... 725/116 |
| 2001/0041980 A1 * | 11/2001 | Howard et al. ................ 704/270 |
| 2002/0056112 A1 * | 5/2002 | Dureau .................. H04H 20/08 |
| | | | 725/78 |
| 2002/0069063 A1 * | 6/2002 | Buchner et al. ............... 704/270 |
| 2005/0071159 A1 * | 3/2005 | Boman et al. ................. 704/233 |

(Continued)

FOREIGN PATENT DOCUMENTS

| | | | | |
|---|---|---|---|---|
| CN | 104363274 A | * | 2/2015 | ............. H04L 29/08 |
| DE | 101 30 852 A1 | | 5/2002 | |
| EP | 1 959 650 A1 | | 8/2008 | |

OTHER PUBLICATIONS

Extended European search report for corresponding EP patent application 14185242.6, dated Mar. 23, 2015.

*Primary Examiner* — Matthew H Baker
(74) *Attorney, Agent, or Firm* — Husch Blackwell LLP

(57) ABSTRACT

A regional monitoring system can include a plurality of voice sensing units each of which incorporates speech recognition circuitry. In response to recognizing a verbal command at a unit, a coded representation, or token, along with location information, can be transmitted to a system control apparatus. Upon receipt of the token, the control apparatus can carry out the requested command or provide requested information.

12 Claims, 2 Drawing Sheets

(56) References Cited

U.S. PATENT DOCUMENTS

| | | | |
|---|---|---|---|
| 2006/0190266 A1* | 8/2006 | Tanigawa | D06F 39/003 704/273 |
| 2006/0271364 A1* | 11/2006 | Mirkovic et al. | 704/239 |
| 2008/0074258 A1* | 3/2008 | Bennett et al. | 340/541 |
| 2013/0183944 A1* | 7/2013 | Mozer et al. | 455/414.1 |
| 2013/0185079 A1* | 7/2013 | Park | D06F 33/02 704/275 |
| 2014/0156281 A1* | 6/2014 | Boyd | H04L 12/281 704/275 |

* cited by examiner

BUILDING AUTOMATION SYSTEMS WITH VOICE CONTROL

FIELD

The application pertains to regional or building automation systems. More particularly, the application pertains to such systems and methods which incorporate voice control and speech recognition to facilitate user interaction with the system.

BACKGROUND

Speech recognition provides simple voice control to lifestyle automation systems. Most systems consist of one main device such a keypad with embedded voice control. In order to expand voice range beyond a single room where the keypad is located, additional satellite speech recognition devices need to be installed in different rooms of a home or building.

Appropriate devices to incorporate speech recognition technology are battery operated wireless sensors. Due to the limited power requirement of these devices, transmitting voice commands back to the central system controller is best implemented using voice tokens. The problem with voice tokens embedded in these devices is that they are not future proof with the main system if there is no method to resynchronize them to the latest command token set.

DETAILED DESCRIPTION

Figure 1:
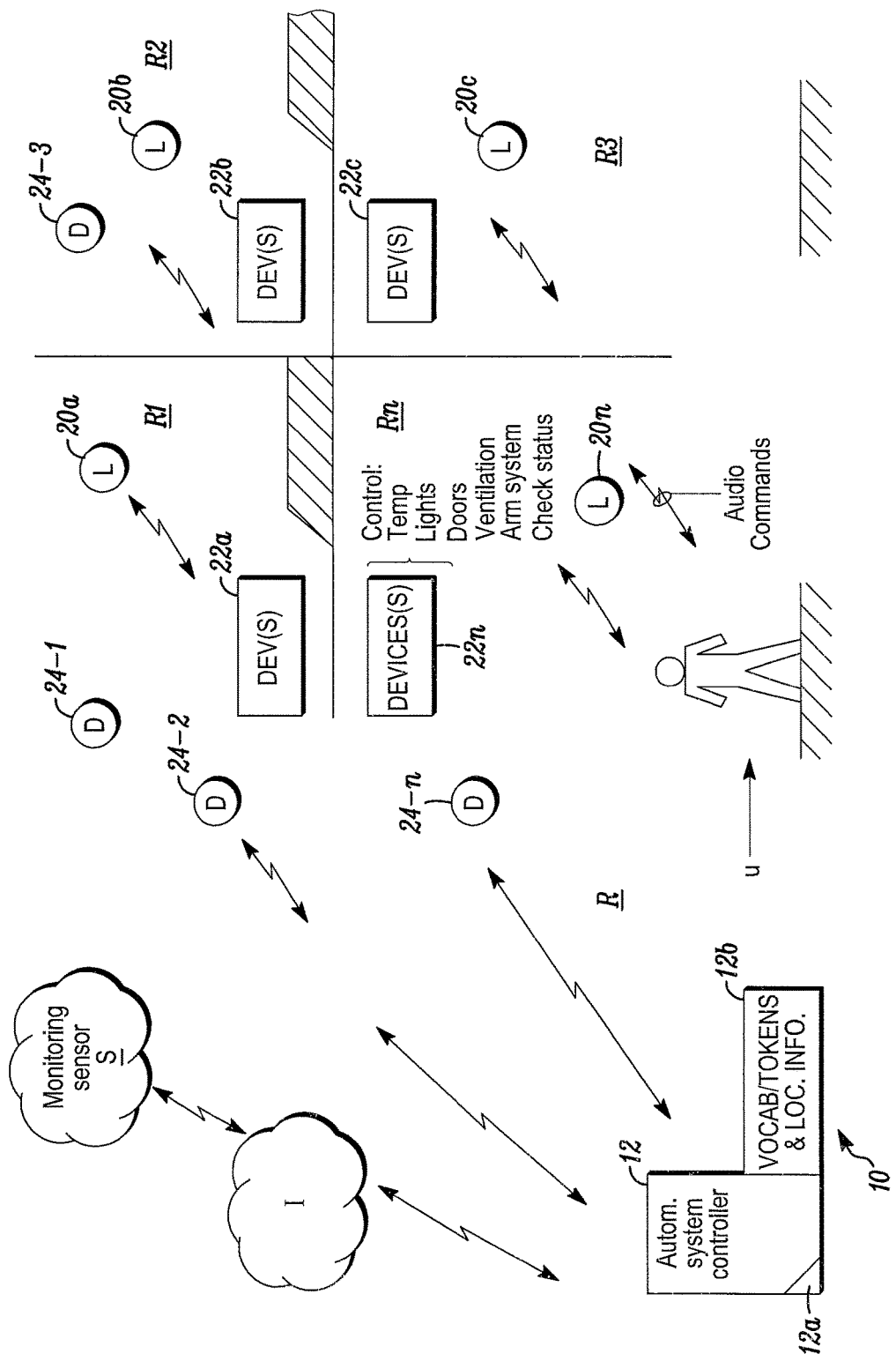
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

Embodiments hereof include embedded speech recognition units using voice command tokens to support a multi-room voice control system and synchronizing with the automation, or monitoring, system controller with periodic voice command token upgrades to support an ever expanding voice command vocabulary.

A home automation system can include a common system processing unit with, or without, embedded speech recognition software. Wireless interfaces can be provided to additional satellite sensors with embedded speech recognition circuitry and software.

Each unit that can process voice commands will transmit voice command tokens back to the main, or system, controller. Location information can also be included with the transmitted tokens.

The main controller will transmit new voice command tokens to all satellite units as the vocabulary of voice commands over time. Obsolete voice command tokens can be removed for the active list in the devices as well.

In one aspect, an automation voice control system can be include an Internet enabled main controller such as a TUX-EDO TOUCH brand automation, monitoring, controller marketed by the Assignee hereof, Honeywell International Inc.

Such controllers can include embedded speech recognition hardware and software and a low power wireless technology that communicates with a plurality of sensors with embedded speech recognition technology. Each sensor can be installed in a different room to pick up voice commands from users and send these voice commands, in the form of command tokens, along with location information back to the main controller to process.

Controller features will expand over time in response online firmware updates. The list of available voice commands could be updated with each firmware upgrade. As the voice command set grows, the controller can transmit new voice tokens to the satellite units so they can be synchronized with the latest commands to offer the best user experience.

The system controller can in turn communicate with various subsystem control units scattered throughout the building to implement the requested commands. Exemplary commands include without limitation, turning lights on or off, locking or unlocking doors, adjusting thermostats, turning fans, or pumps, on or off. Status information could also be verbally requested. In another aspect, where tokens have been sent to a controller or other type of unit, they can be expanded as needed into machine generated speech and provided as a local, verbal, response.

FIG. 1 illustrates an apparatus 10 installed in a region R to implement a building automation system responsive to voice commands. An automation system controller 12 is installed on or about the premises R. Controller 12 could be internet enabled and firmware 12a therein can be downloaded, via the internet I from a monitoring server S as would be understood by those of skill in the art.

Controller 12 can also include, for example in semiconductor storage, a list of commands, or vocabulary, and associated tokens 12b. Location information can also be included in or associated with the list 12b.

The region R can be subdivided into a plurality of separate spaces or rooms R1, R2, R3 . . . Rn through which a user U might move. To implement a voice responsive capability apparatus 10 can include a plurality of voice responsive units, or modules, 20a, 20b, 20c . . . 20n where a module is associated with a respective one of the rooms Ri.

Each of the rooms can include a respective control device such as 22a, 22b, 22c . . . 22n which can be in wired or wireless communications with the controller 12. The control devices 22i can interface to regional control systems and carry out various types of control functions such as temperature, lighting, door control, or ventilation all without limitation. Where devices 22i include audible output transducers, they can provide verbal feedback to the user U in response to commands to change status of some or all of the automation system elements, or report on the status of various aspects of the apparatus 10.

A plurality of condition detectors 24-1, 24-2 . . . 24-n can be installed throughout the region R to provide feedback, wired or wirelessly, to the controller 12. These can include, without limitation, door or window position sensors, glass brakeage detectors, smoke, fire or thermal detectors, water or humidity detectors.

In use, a user U an traverse room of the region R and speak verbal commands which can be sensed and processed by the units 20i, as discussed in more detail subsequently. The units 20i can communicate wirelessly with the controller 12 by transmitting location/context aware request indicating tokens to controller 12. Controller 12 can then respond to the requested command by activating an appropriate one of the control devices, such as 22i. Controller 12 could verbally announce the received request along with the action to be taken in response thereto.

Figure 2:
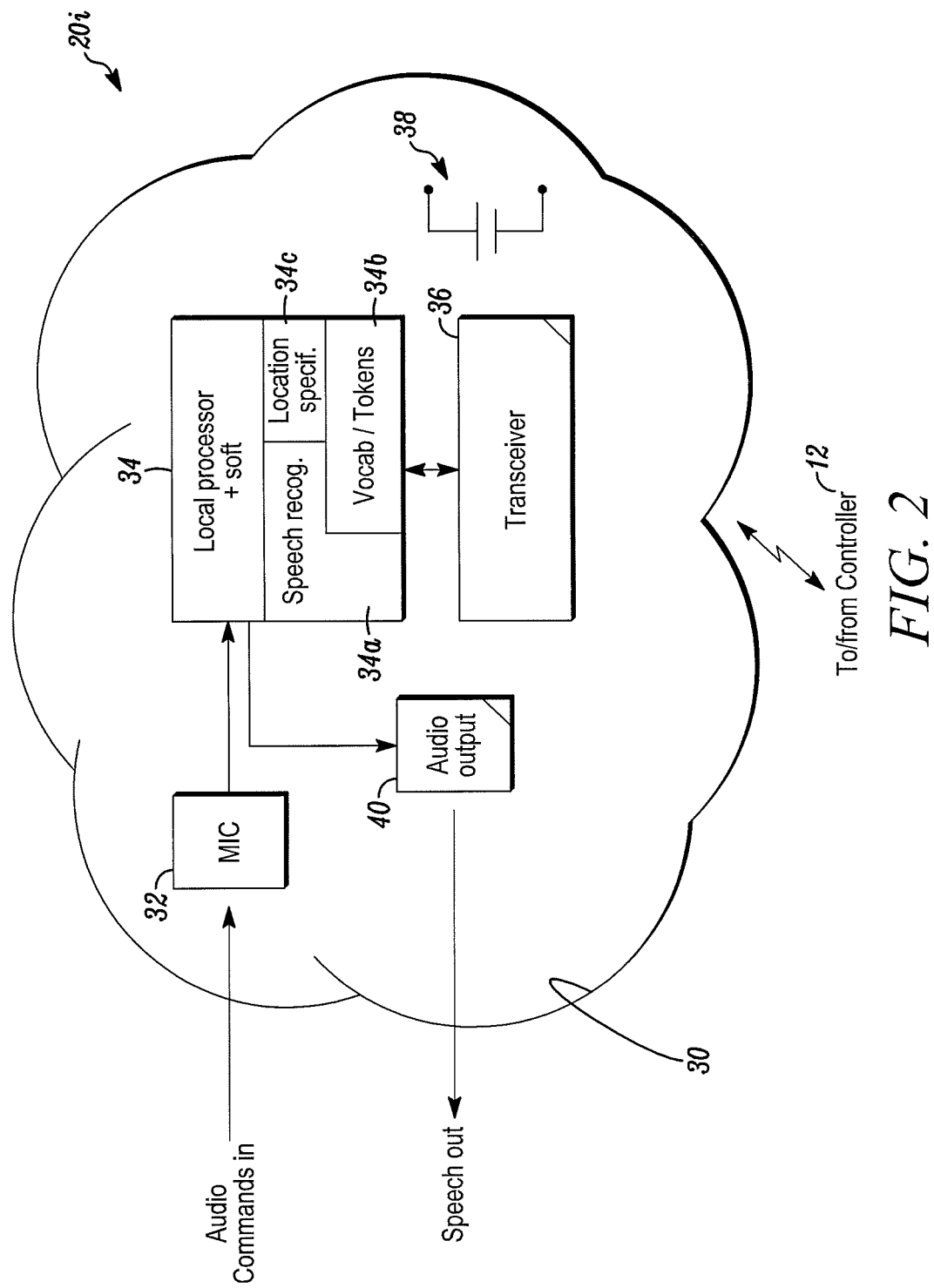
FIG. 2 is a block diagram of a speech recognition unit.

FIG. 2 illustrates an exemplary block diagram of a respective one of the speech sensing units 20i. Unit 20i can be carried in a housing 30. It can include a speech receiving microphone 32 which is coupled to a local processor with associated control software 34. Other members of the plurality 20 are substantially identical to the unit 20i and need not be discussed further.

Processor 34 can also include speech recognition software 34a, a list of recognizable speech, the available vocabulary, and associated tokens 34b along with user specifiable location information 34c. Wireless communications can be implemented by a transceiver 36 coupled to processor 34. Unit 20i can be powered by a local battery 38. An audio, or speech, output device 40 can be coupled to the local processor 34 to output token generated speech.

In summary, user U can move through the region R issuing verbal commands which are sensed by a respective verbal sensor, such as 20i. Sensor 20i can then process the received speech, and transmit a corresponding token, and perhaps location related information to controller 12 for implementation.

Controller 12 can regularly, or intermittently download updated token (s) to the members of the plurality 20 which can add them to their local list, for example 34b for subsequent use. In other instances, updated tokens received at a voice responsive unit, such as 20i, can be expanded into respective speech via output device 40, to confirm accurate receipt of the corresponding token.

Those of skill will understand that the tokens need not be stored in lists but could be stored in any configuration desired. Alternately, tokens can be generated dynamically as needed for transmission to the respective controller, such as 12 all without limitation.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method comprising:
 establishing a common control element associated with a region being monitored, wherein establishing the common control element comprises connecting a control unit to a condition detector selected from a group consisting of a door position sensor, a window position sensor, a glass breakage detector, a smoke detector, a thermal detector, a fire detector, a water detector, and a humidity detector, wherein establishing the common control element further comprises connecting said control unit to a control device, and wherein said control device is adapted to control doors, lights, ventilation, temperature, or an alarm;
 distributing speech sensing units in the region;
 receiving and recognizing a speech input at one of the speech sensing units;
 processing the speech input to establish a coded representation of the speech input;
 transmitting the coded representation to the control unit, wherein said coded representation comprises a first voice token;
 the control unit downloading a firmware update including a new voice token for a new voice command;
 responsive to the control unit downloading the firmware update, the control unit transmitting the new voice token to the speech sensing units without transmitting an entirety of the firmware update to the speech sensing units; and
 adding the new voice token to a respective local list of saved voice tokens stored in each of the speech sensing units after the control unit downloads the firmware update.

2. The method as in claim 1 further comprising deleting obsolete voice tokens stored in each of the speech sensing units.

3. The method as in claim 1 wherein, responsive to the coded representation, the control unit executes a first voice command associated with the coded representation.

4. The method as in claim 1 further comprising transmitting location information from the one of the speech sensing units.

5. The method as in claim 4 further comprising maintaining a second list of current voice tokens stored in the control unit.

6. The method as in claim 5 further comprising forwarding at least a portion of the second list to the speech sensing units.

7. The method as in claim 6 further comprising updating the second list forwarded to the speech sensing units.

8. The method of claim 1 wherein a first connection between said control unit and said condition detector is wireless, and wherein a second connection between said control unit and said control device is wireless.

9. A system comprising:
 a common element that monitors conditions in a region, wherein said common element comprises a control unit connected to a condition detector selected from a group consisting of a door position sensor, a window position sensor, a glass breakage detector, a smoke detector, a thermal detector, a fire detector, a water detector, and a humidity detector, wherein the control unit is connected to a control device, and wherein said control device is adapted to control doors, lights, ventilation, temperature, or an alarm; and
 a plurality of wireless voice command sensing units,
 wherein each of the plurality of wireless voice command sensing units is in communication with the control unit and transmits respective first coded representations of respective recognized speech commands to the control unit,
 wherein the control unit downloads a firmware update including a new coded representation for a new voice command,
 wherein, responsive to the control unit downloading the firmware update, the control unit transmits the new coded representation to the plurality of wireless voice command sensing units without transmitting an entirety of the firmware update to the plurality of wireless voice command sensing units,
 wherein each of the plurality of wireless voice command sensing units includes respective control circuitry to store a respective set of current coded representations, to receive the new coded representation from the control unit, and to add the new coded representation to the respective set of the current coded representations stored in a respective one of the plurality of wireless voice command sensing units after the control unit downloads the firmware update, and wherein said respective first coded representations, said new coded representation, and said current coded representations are voice tokens.

10. The system as in claim 9 wherein each of the plurality of wireless voice command sensing units includes respective speech recognition circuitry.

11. The system of claim 9 wherein a first connection between said control unit and said condition detector is wireless, and wherein a second connection between said control unit and said control device is wireless.

12. A regional monitoring system comprising:
a control unit; and
a plurality of voice sensing units in communication with the control unit,
wherein each of the plurality of voice sensing units incorporates respective speech recognition circuitry,
wherein, in response to recognizing a first verbal command at one of the plurality of voice sensing units, a first coded representation and location information are transmitted to the control unit,
wherein said control unit is connected to a condition detector selected from a group consisting of a door position sensor, a window position sensor, a glass breakage detector, a smoke detector, a thermal detector, a fire detector, a water detector, and humidity detector,
wherein said control unit is connected to a control device,
wherein said control device is adapted to control doors, lights, ventilation, temperature, or an alarm,
wherein, upon receipt of the first coded representation, the control unit performs the first verbal command associated with the first coded representation,
wherein the control unit downloads a firmware update including a new coded representation for a new voice command,
wherein, in response to the control unit downloading the firmware update, the control unit transmits the new coded representation to the plurality of voice sensing units without transmitting an entirety of the firmware update to the plurality of voice sensing units, and
wherein each of the plurality of voice sensing units adds the new coded representation to a respective local list of commands stored in a respective one of the plurality of voice sensing units after the control unit downloads the firmware update.

* * * * *